United States Patent [19]

Leahy

[11] 3,996,702
[45] Dec. 14, 1976

[54] COATED ABRASIVE PRODUCT COMPRISING FUSED ZIRCONIA GRAINS AND METHOD FOR ABRADING IRON

[75] Inventor: Sidney M. Leahy, North Oaks, Minn.

[73] Assignee: Minnesota Mining and Manufacturing Company, St. Paul, Minn.

[22] Filed: May 27, 1976

[21] Appl. No.: 690,599

Related U.S. Application Data

[63] Continuation of Ser. No. 527,432, Nov. 26, 1974, abandoned, which is a continuation of Ser. No. 99,716, Dec. 18, 1970, abandoned, which is a continuation-in-part of Ser. No. 722,172, April 18, 1968, abandoned.

[52] U.S. Cl. .................................. 51/328; 51/295; 51/298 A; 51/309 R
[51] Int. Cl.² ................... B24D 11/00; C09K 3/14
[58] Field of Search ............ 51/328, 295, 298, 309, 51/297, 299, 281; 428/56, 143, 144, 145, 146, 147, 148, 149, 150, 240; 106/57

[56] References Cited

UNITED STATES PATENTS

| | | | |
|---|---|---|---|
| 1,240,490 | 9/1917 | Saunders et al. | 51/308 |
| 1,240,491 | 9/1917 | Saunders et al. | 51/308 |
| 2,369,709 | 2/1945 | Baumann et al. | 51/309 |
| 2,768,887 | 10/1956 | Rosenberg et al. | 51/309 |
| 2,769,699 | 11/1956 | Polch | 51/298 |
| 2,877,105 | 3/1959 | Smith | 51/308 |
| 2,981,615 | 4/1961 | Baumgartner | 51/297 |
| 2,986,455 | 5/1961 | Sandmeyer | 51/296 |
| 3,029,160 | 4/1962 | Van Der Beck | 51/295 |
| 3,175,894 | 3/1965 | Foot | 51/298 |
| 3,181,939 | 5/1965 | Marshall et al. | 51/309 |
| 3,205,054 | 9/1965 | Tucker | 51/298 |
| 3,454,385 | 7/1969 | Amero | 51/298 |
| 3,498,769 | 3/1970 | Coes | 51/298 |
| 3,781,172 | 12/1973 | Pett et al. | 51/309 |
| 3,787,273 | 1/1974 | Okrepkie et al. | 51/298 |
| 3,893,826 | 7/1975 | Quinan et al. | 51/297 |

Primary Examiner—Donald J. Arnold
Attorney, Agent, or Firm—Alexander, Sell, Steldt & DeLaHunt

[57] ABSTRACT

The cutting rate and useful life of conventional resin bonded coated abrasive products in extremely high pressure abrading operations is significantly increased by using abrasive mineral which consists essentially of fused zirconia. Substantial amounts of diluent may be included, e.g., by blending other less effective abrasive grains with fused zirconia grains or by crushing a hardened co-fusion of alumina and zirconia.

11 Claims, No Drawings

COATED ABRASIVE PRODUCT COMPRISING FUSED ZIRCONIA GRAINS AND METHOD FOR ABRADING IRON

CROSS-REFERENCE TO RELATED APPLICATION

This application is a continuation of copending application Ser. No. 527,432, filed Nov. 26, 1974 and now abandoned, which application is a continuation of Ser. No. 99,716 filed Dec. 18, 1970 and now abandoned, Ser. No. 99,716 in turn being a continuation-in-part of copending application Ser. No. 722,172, filed Apr. 18, 1968 and now abandoned.

BACKGROUND OF THE INVENTION

This invention relates to high pressure abrading processes and to coated abrasive products having particular utility for use therein.

For over half a century fused zirconium oxide (zirconia, or $ZrO_2$) has been known to be a hard mineral having use as an abrasive grain for grinding wheels; see, e.g., U.S. Pat. No. 1,240,990. In this environment, fused zirconia has been used alone (U.S. Pat. Nos. 2,769,699 and 2,943,926) and also combined with fused aluminum oxide (alumina, or $Al_2O_3$) either by blending grains of the two minerals (U.S. Pat. No. 3,175,894) or by forming grains from a hardened co-fused blend of alumina and zirconia (U.S. Pat. Nos. 1,240,990 and 3,181,939). Fused zirconia has also been employed as loose grain in polishing glass (see U.S. Pat. Nos. 2,624,661 and 2,955,031).

It is particularly interesting to note that apparently no one has heretofore contemplated the use of zirconia grains in a coated abrasive structure, for coated abrasive products are perhaps older than grinding wheels. Alumina grains and silicon grains are both, for example, commonly used in both molded wheels and coated abrasives. There are apparently sound reasons for not incorporating zirconia grains in a coated abrasive product, since zirconia is actually softer than garnet, an abrasive grain which is almost never employed in metal working. Even if a worker in the coated abrasive field had been sufficiently intrigued by zirconia to try it, he would have found that in most abrading operations performance was far below that achieved with the considerably less expensive aluminum oxide.

To show the normal effect of utilizing fused zirconia in coated abrasive products, two lots of materials were prepared. Each lot was made on a conventional starch-hand glue-filled drills cloth backing, using conventional calcium carbonate-filled phenol-formaldehyde make and sandsize resins, and Grade 50 mineral. The sole difference between the two lots was the type of mineral employed--fused alumina for Lot A and Exolon "AZ-40" (co-fused 60:40 alumina: zirconia blend) for Lot B. Each lot was then slit to 3-inch width, formed into several 132-inch endless belts, and evaluated for ability to abrade various alloys. Each belt was in turn entrained over a smooth rubber contact roll driven at 6500 surface feet per minute, ± 5%. Compressed air was applied to a cylinder which urged the various workpieces against the belt, the total force actually applied being calculated from the line pressure and cylinder diameter. Initial rate of cut was then determined by 10 or 12 consecutive brief (3 to 5 second duration) grinding passes. Results are tabulated below:

| Test piece material | Cross-section | Pressure on workpiece, psi | Total grinding time, seconds | Total cut, grams | | Percentage cut | |
|---|---|---|---|---|---|---|---|
| | | | | Lot A | Lot B | Lot A | Lot B |
| Waspalloy | ¾" diam. circle | 10-20-30 | 36 | 23 | 8 | 100 | 35 |
| 1095 tool steel | " | 340 | 30 | 205 | 137 | 100 | 67 |
| Inconel Stainless steel | " | 575 | 30 | 253 | 148 | 100 | 58 |
| 1018 mild | ¾" × ½" | 400 | 30 | 158 | 95 | 100 | 60 |
| steel | 1" × 1" | 150-250-350 | 60 | 425 | 139 | 100 | 33 |

It will be observed that on all five types of workpieces the initial rate of cut of coated abrasive products made with 60:40 co-fused alumina:zirconia abrasive grain is about one-third to two-thirds less than that of coated abrasive products made with fused alumina mineral.

Summary

The present invention provides a means of rapidly removing stock from iron castings containing free graphite, by a process wherein a rapidly moving supported coated abrasive product is forced against a workpiece at high pressures, on the order of at least 200 psi; at least a significant percentage of the abrasive grains consist essentially of fused zirconia. In this application, not only is stock removed at an extremely rapid rate, but the useful abrading life of the coated abrasive product substantially exceeds--sometimes by several fold--that of a product employing conventional coated abrasive minerals.

Grains of fused zirconia can be used as the sole abrading material in coated abrasive products employed to practice this invention. To reduce the cost of the product without unduly reducing performance, however, it is considered desirable to include a substantial proportion of alumina or other diluent. Alumina grains can either be blended with zirconia grains or, alternatively, grains may be formed by crushing hardened fused blends of alumina and zirconia. If desired, softer grains (e.g., flint), which function in a manner analogous to that of filler or diluent, may be blended with fused zirconia-containing grains, such softer grains being quickly rendered ineffective under the high pressures utilized in the practice of this invention.

Fused zirconia grains may have a crystal lattice which is monoclinic, cubic, or a blend of the two. Zirconia which is made by merely fusing and crystallizing zircon ore is termed "unstabilized", and is mainly monoclinic. The addition of minor percentages of lime to the melt "stabilizes" the zirconia, causing it to be primarily cubic. Either stabilized or unstabilized fused zirconia grains may be employed in the practice of this invention although unstabilized are generally preferred.

It is particularly interesting to note that zirconia grains actually detract from the effectiveness of coated abrasive products for abrading most metals and that the unexpected utility of zirconia grain is not attained until it is incorporated in coated abrasive products used at comparatively high pressures, on the order of at least about 200 psi. Below this pressure, both the coated abrasive product and the workpiece tend to burn. The pressure should generally not exceed 1200 psi. To obtain an optimum combination of uniform cutting rate and coated abrasive life, it is generally preferred initially to apply the lowest effective pressure, gradually increasing it during use.

It is also interesting to note that the process of this invention is effective essentially only when the material being abraded is cast iron, or a modified form thereof, containing free carbon. Cast iron generically includes those hard, brittle commercial alloys of iron carbon and silicon containing about 2 – 4½% carbon and 1 to 4% silicon. Gray cast iron contains much graphitic carbon, as contrasted to white cast iron, the carbon content of which is almost entirely in combined form (cementite). Malleable iron is formed by annealing white cast iron to convert the hard brittle cementite to nodular graphite, thereby imparting greater ductility than is possessed by either white or gray cast iron. Nodular, or ductile, iron is produced by adding alloys of magnesium or cerium to molten gray iron; the addition causes the graphite to form as small nodules or spheroids instead of the normal angular flakes. The present invention, which is particularly useful in the grinding of gray iron, malleable iron and ductile iron, appears to offer little or no advantage in the grinding of mild steel and similar alloys.

Blends of fused zirconia grains and fused alumina grains are effective when they contain as little as 10% zirconia by weight. As a compromise between cost and performance, however, the particularly preferred practice of this invention includes the use of coated abrasive products in which the zirconia:alumina weight ratio in the abrasive grains is at least about 1:2 (say, 25–40% zirconia by volume). Because the primary utility of this product is in high pressure operations requiring heavy stock removal, it is also preferred that the abrasive grains themselves should be on the order of 100 mesh or coarser.

It should be clear at this point that applicant does not contend that he has invented any new abrasive grains or any new combinations of abrasive grains. Neither does he contend that he has been the first to incorporate such grains in an abrasive product. Rather, the invention is primarily concerned with a novel high pressure process for abrading certain iron alloys containing free carbon with coated abrasive products. The coated abrasive product used in this process has never, insofar as applicant is aware, existed before.

DESCRIPTION OF PRESENTLY PREFERRED EMBODIMENTS

Although numerous ways of practicing the invention will be clear from the foregoing, understanding of the invention will be facilitated by referring to the following example, in which all parts are by weight unless otherwise noted: Unless otherwise noted, in each case the backing is conventional starch- and glue-filled drills cloth having a hide glue backsize and a phenol-formaldehyde resin presize. The make and sandsize adhesives are also conventional calcium carbonate-filled phenol formaldehyde resins, the sole variable being the type of mineral employed. An attempt is made to compensate for the different mineral densities so as to apply a constant volume of mineral for a given grade, the exact amount corresponding to established coated abrasive manufacturing standards. Coating weights are in grains per 24 square inches of backing. In all abrading tests referred to hereinafter, a 3 × 132 inches endless belt is entrained over a smooth hard rubber contact roll having a diameter of 24 inches and driven at 7800 surface feet per minute. A set of 12-inch, rectangular cross-sectioned workpiece test bars is weighed, the first bar abraded until 2 inches is removed, the second bar then being abraded until 2 inches is removed, and so on until a predetermined actual abrading time has elapsed. The set of bars is then re-weighed, and the abrading process repeated, the test ending when the belt shells or burns and is no longer useful. A pneumatic cylinder, containing a piston opposed by a coil spring, supplies the force which urges the workpiece toward the belt, so that the force actually exerted on the workpiece is gradually reduced as the spring is compressed during the 2-inch stroke. Pressure figures reported in the examples below represent the force applied to the piston at approximately mid-stroke divided by the cross-sectional area of the workpiece employed.

EXAMPLE 1

Two lots of Grade 36 coated abrasive sheet material were prepared by electrostatically coating a standard volume of mineral. In control Lot A, 218 grains of conventional fused alumina (density 3.97) was applied, while in Lot B 240 grains of a crushed co-fused 40:60 zirconia alumina mineral (Exolon "AZ-40", density 4.50) was applied.

Pre-weighed bars of No. 32510 malleable iron (cast and fully annealed; minimum tensile and yield values 53,000 psi and 35,000 psi respectively) having cross-sectional dimensions of 1 × 1 inches, were forced at a pressure of 350 psi against the belt. Control Lot A removed 10.4 pounds of metal before failing after about 4½ minutes. In contrast, the experimental belt of this example cut 19.8 pounds of metal before failing after 9 minutes.

Zirconia:alumina minerals containing about 40% $ZrO_2$ and 60% $Al_2O_3$ (the type used in Lot B) are also obtainable from Simonds Abrasive Company under the trade designation "ZA-40", General Abrasives Corporation under the trade designation "ZM", Dynamit Nobel under the trade designation "Dynacor", and Carborundum Company under the trade designation "R-81".

EXAMPLE 2

Three lots of Grade 36 resin-bonded cloth-backed sheet material were made as in Example 1 and tested using one fourth × one half cross-section malleable iron test bars, at a pressure of approximately 1100 psi. The results were as follows:

| Lot | Mineral | Mineral weight | Time, minutes | Total Cut, lbs. |
|---|---|---|---|---|
| A | alumina | 215 | 6:08* | 4.59 |
| B | 40:60 zirconia: alumina (General Abrasive Corporation "ZM") | 221 | 11:00 | 10.98 |

-continued

| Lot | Mineral | Mineral weight | Time, minutes | Total Cut, lbs. |
|---|---|---|---|---|
| C | zirconia | 274 | 9:50* | 12.83 |

*Belt broke

EXAMPLE 3

To determine the effect of various co-fused blends of alumina and zirconia, a series of lots of Grade 36 products, having various zirconia:alumina ratios were prepared, mineral being applied by gravity coating methods. The products were then tested with malleable iron bars having a cross-section of 1 × 1 inch, at a pressure of approximately 340 psi; belt speed was 7500 sfpm. Results were as follows:

| Lot | Zirconia:alumina ratio | Coating weight | Time, minutes | Cut, lbs. |
|---|---|---|---|---|
| A | 0:100 | 219 | 2 | 2.31 |
| B | 40:60 | 265 | 2 | 2.78 |
| C | 50:50 | 280 | 2 | 2.16 |
| D | 57:43 | 285 | 3 | 4.49 |
| E | 65:35 | 301 | 3 | 3.45 |
| F | 74:26 | 293 | 4 | 4.90 |

EXAMPLE 4

This example illustrates the comparative effectiveness of various electrostatically coated physical blends of Grade 36 alumina grains and Grade 36 zirconia grains; malleable iron test bar cross-sectional dimensions were one half × three fourths inch, at a pressure of approximately 900 psi.

| Lot | Zirconia:alumina ratio | Coating weight | Time, minutes | Cut, lbs. |
|---|---|---|---|---|
| A | 0:100 | 218 | 4 | 4.70 |
| B | 20:80 | 220 | 5 | 6.67 |
| C | 40:60 | 236 | 7 | 8.31 |
| D | 60:40 | 253 | 9 | 12.68 |
| E | 80:20 | 268 | 12 | 18.53 |
| F | 100:0 | 287 | 11 | 18.13 |

EXAMPLE 5

This example describes the preparation of Grade 24 mineral products having a 20-mil vulcanized fiber backing instead of the cloth backing employed in Example 4. Coating weights and abrading results (at 900 psi grinding pressure, using malleable iron bars), are tabulated below:

| Lot | Mineral | Coating weight, grains per 4×6 | Time, minutes | Total cut.lbs. |
|---|---|---|---|---|
| A | alumina | 316 | 5 | 9.00 |
| B | 40:60 zirconia:alumina (General Abrasives "ZM") | 373 | 5 | 13.31 |
| C | 40:60 zirconia:alumina (Exolon "AZ-40") | 380 | 11 | 21.37 |

EXAMPLE 6

The preceding examples all disclose the use of unstabilized fused zirconia grains. This example illustrates that stabilized fused zirconia is also useful. Malleable iron test bars having one half × three fourths inch cross-section were ground at a pressure of 900 psi, the mineral being Grade 36 in all cases.

| Lot | Mineral | Time, minutes | Cut. lbs. |
|---|---|---|---|
| A | $Al_2O_3$ | 5 | 7.47 |
| B | Stabilized $ZrO_2$ | 10 | 18.57 |
| C | Unstabilized $ZrO_2$ | 13 | 29.12 |

EXAMPLE 7

This example illustrates the grinding of gray cast iron (Class 30, medium tensile) test bars having 1 × ½ inch cross-sections at a pressure of about 675 psi, using Grade 36 mineral. Results (2-belt averages) are tabulated below:

| Lot | Mineral | Time, minutes | Total Cut, lbs. |
|---|---|---|---|
| A | $Al_2O_3$ | 6½ | 11.34 |
| B | 40:60 $ZrO_2$:$Al_2O_3$ | 11½ | 19.64 |

EXAMPLE 8

This example illustrates the grinding of composition or Grade 80-60-03 nodular (ductile) iron (minimum tensile and yield strength 80,000 psi and 60,000 psi respectively) bars having 1 × 1 inch cross-sections at a pressure of 340 psi. Both Grade 36 and Grade 24 mineral were used. Results are shown below:

| Lot | Mineral Grade | Type | Time, minutes | Total cut, lbs. |
|---|---|---|---|---|
| A | 36 | $Al_2O_3$ | 13 | 31.5[1] |
| B | 36 | 40:60 $ZrO_2$:$Al_2O_3$ | 36 | 104.3[2] |
| C | 24 | 40:60 $ZrO_2$:$Al_2O_3$ | 36 | 131[3] |

[1]Test stopped because belt cutting less than 1 lb/minute.
[2]Belt had cut 44 lbs. in 13 minutes; still cutting at the rate of over 2 lbs/minute when test was terminated.
[3]Belt had cut over 50 lbs. in 13 minutes; still cutting at the rate of over 3¼ lbs./minute when test was terminated.

EXAMPLE 9

Six lots of Grade 24 coated abrasive sheet material were prepared by gravity-coating a standard volume of abrasive mineral of the type shown in the table shown below. Pre-weighed bars of ductile iron having 1 × 1 inch cross-section were abraded at 315 psi. Results were as follows:

| Lot | Mineral | Knoop hardness | Time, minutes | Total cut.lbs. |
|---|---|---|---|---|
| A | Co-fused 40:60 $ZrO_2$:$Al_2O_3$ (Exolon "AZ-40") | 1500–1600 | 25 | 57 |
| B | $Al_2O_3$ | 2100 | 9 | 12 |
| C | Garnet | 1360 | :25 | 1 |
| D | Flint | 820 | :15 | 0.4 |
| E | 1:1 mechanical blend of "AZ-40" and $Al_2O_3$ | — | 13:30 | 24 |
| F | 1:1 mechanical blend of "AZ-40" and garnet | — | 16 | 30 |
| G | 1:1 mechanical blend of "AZ-40" and flint | — | 17 | 36 |

*Major phase hardness; minor $ZrO_2$ phase has a hardness of about 1100 and minor $Al_2O_3$ phase has a hardness of about 2500.

The foregoing data clearly show that by far the best results were obtained with the belt having the highest fused zirconia content. The data also seems to indicate the feasibility of using blends of the co-fused $ZrO_3$:$Al_2O_3$ mineral with even extremely soft grains which have no utility per se for abrading ductile iron. In each case, the blended mineral performed far better than did $Al_2O_3$ mineral alone. It would thus appear that the additive mineral is really functioning as a diluent grain rather than an abrasive.

What is claimed is:

1. Coated abrasive sheet material especially suited for formation into endless belts, said sheet material having a durable, flexible woven cloth backing and abrasive grains firmly adherently bonded thereto by a hardened phenol-formaldehyde resin, at least 10% of the total weight of said grains consisting of fused zirconia, the balance of the total weight of said grains being no harder than fused alumina, whereby at high pressures an endless belt formed from said sheet material abrades, before failure, a significantly greater weight of free carbon-containing iron castings than does a belt of identical construction except for the use of abrasive grains free from fused zirconia.

2. The product of claim 1 in which the fused zirconia is at least in part unstabilized zirconium oxide.

3. The product of claim 1 in which the abrasive grains are comprised of fused zirconia and fused alumina.

4. The product of claim 3 in which the abrasive grains are comprised of at least 40% fused zirconia by weight.

5. The product of claim 1 in which the abrasive grains consist essentially of fused zirconia and fused alumina.

6. The product of claim 1 wherein the abrasive grains consist essentially of a co-fused blend of zirconia and alumina.

7. The product of claim 6 wherein the blend consists of approximately 40% zirconia by weight.

8. A coated abrasive product having a durable vulcanized fiber backing and abrasive grains firmly adherently bonded thereto by a hardened phenol-formaldehyde resin, at least 10% of the total weight of said grains consisting of fused zirconia, the balance of the total weight of said grains being no harder than fused alumina, whereby at high pressures said product, before failure, abrades a significantly greater weight of free carbon-containing iron than does a product of identical construction except for the use of abrasive grains free from fused zirconia.

9. In the method for abrading an iron alloy workpiece containing free carbon, said method consisting of forcing said workpiece against a supported, rapidly moving coated abrasive medium, comprising a flexible, durable sheet with abrasive grains adherently bonded thereto by a strong hardened synthetic resin, the improvement consisting of using fused zirconia as at least 10% of the total weight of said abrasive grains, the balance of the total weight of said grains being no harder than fused alumina, and applying a force to said workpiece sufficient to provide a pressure of at least 200 psi.

10. The method of claim 9 wherein the fused zirconia is stabilized.

11. The coated abrasive sheet material of claim 1 in the form of an endless belt.

* * * * *